June 1, 1943. H. G. BUSIGNIES 2,320,908
RADIO COMPASS
Filed March 5, 1941

INVENTOR.
HENRI G. BUSIGNIES.
BY
ATTORNEY

Patented June 1, 1943

2,320,908

UNITED STATES PATENT OFFICE 2,320,908

RADIO COMPASS

Henri G. Busignies, Forest Hills, N. Y., assignor to International Standard Electric Corporation, New York, N. Y., a corporation of Delaware Application March 5, 1941, Serial No. 381,837

6 Claims. (Cl. 250—11)

The present invention relates to radio direction finders and especially to those direction finders commonly known as "radio compasses" which operate to indicate the direction of arrival of a radio wave.

It is an object of the invention to provide a simple and efficient radio compass. It is a further object to provide such a radio compass which shall be particularly adapted for use in guiding aeroplanes so as to maintain a constant attitude with respect to the direction of arrival of radio signals. Thus, for example, an aeroplane may be maintained constantly directed toward the source of radio signals in case it is desired to fly toward a city containing a transmitting station in the absence of substantial cross winds; or the aeroplane may be maintained at a given angle, e. g. 10°, with respect to the arriving signals in case a cross wind exists sufficient to cause a 10° drift. The radio compass of the present invention is particularly adapted for use in such navigation.

It is another object of the invention to provide a radio compass which shall be usable to determine the direction of keyed or modulated signals as well as of unmodulated carrier wave signals.

It is still a further object to provide a radio compass which shall give an extremely sharp and precise directional indication.

The exact nature of the invention may best be understood from the following detailed description taken together with the attached drawing in which Fig. 1 represents an embodiment of my invention;

Figure 1:
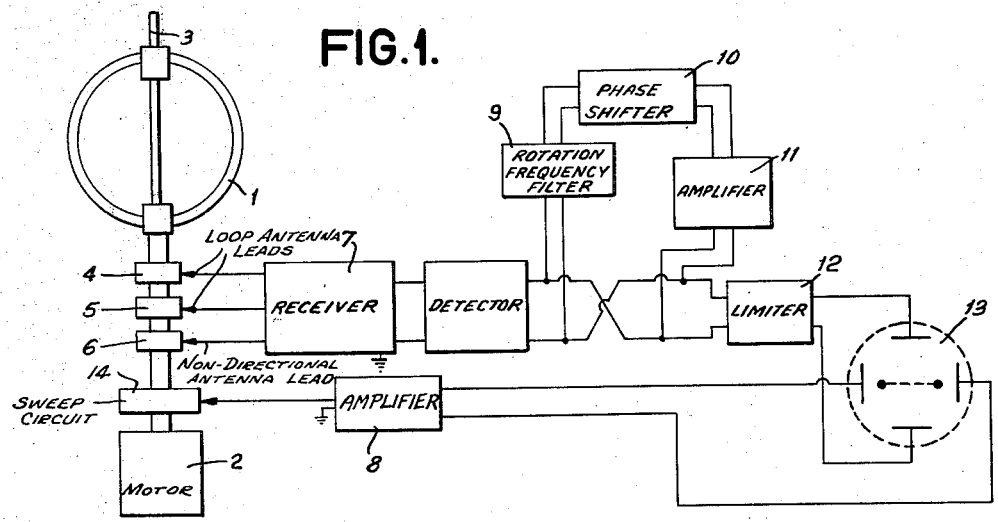

Referring more particularly to Fig. 1 a loop antenna 1, which is rotated at constant speed by a motor 2, picks up energy from a radio wave whose direction is to be determined, and delivers such energy modulated in accordance with the loop rotation, over slip rings 4 and 5 to receiving and detecting apparatus 7. A non-directional antenna 3 also receives energy from the same wave and delivers it over slip ring 6 to another input of the same receiving and detecting apparatus 7. In the receiver and detector 7 the rotation-modulated wave from loop 1 is added to the unmodulated wave from antenna 3 preferably by the aid of a vacuum tube to minimize intercoupling between the loop and other antenna.

The detected output from receiving and detecting apparatus 7 is inverted and passed through a limiter 12 to the vertical deflecting plates of a cathode ray tube 13. A rotation frequency component of the detected output of 7 is also passed through filter 9, phase shifter 10 and amplifier 11 to the input of limiter 12 where it is mixed with the inverted output from 7 as is clearly shown in Fig. 1. The resultant wave applied to the limiter contains two sharp peaks per revolution of loop 1, the time of arrival of such peaks being dependent upon the direction of the incoming radio wave. Since these sharp peaks are alternately higher and lower in amplitude, as will be hereafter more fully explained, the limiter serves to select alternate ones of such peaks thus giving to the vertical deflection plates of cathode ray tube 13 only one single deflecting pulse per rotation of loop 1.

Sweep circuit 14 mounted on the same shaft as loop 1 generates linear sweep waves which are amplified in amplifier 8 and applied to the horizontal deflecting plates of cathode ray tube 13. The sweep circuit generator 14 preferably consists of a rotary rheostat arranged to increase gradually in resistance during a complete rotation and then suddenly return to its initial resistance value and recommerce the slow increase of resistance, such rotary rheostat then being connected in series with a battery or other source of potential (not shown) in order to produce the required sweep waves in synchronism with the rotation of loop 1. Any other form of sweep generator capable of being synchronized with the rotation of loop 1 may be used, such as for example an electronic sweep circuit which may be synchronized by a periodic pulse conductively, capacitatively or electromagnetically induced from some moving part of the shaft of loop 1.

The manner of operation of the embodiment shown in Fig. 1 and above described can best be explained in connection with the curves in Fig. 2.

Assuming for simplicity of explanation that unmodulated carrier waves are being received. These waves when picked up by rotating loop 1 will be modulated to such an extent as to give phase reversal thus having an envelope characterized by sharp cusp shaped minima as shown in curve I, Fig. 2. The addition of a small amount of unmodulated carrier from non-directional antenna 3 renders the alternate loops of such curve unequal as shown in curve II.

So far as possible all variations of the relative strengths of the non-directional antenna and the loop antenna should be avoided so as to avoid varying the angular position of the cusp shaped minima of the wave of curve II. It is preferred also that only a small amount of non-directional signals be added since then a given percentage variation of the amplitude of the non-directional waves received will produce a smaller angular variation of the position of the sharp cusp shaped minima of curve II.

The directional and non-directional signals after being added together in the receiver 7 are amplified to any desired extent and preferably are also altered in frequency by the heterodyne process in order to facilitate amplification without howling as well as to increase selectivity. In the output of receiver 7 the signals are detected to yield a wave of the form shown in curve III. It will be noted that this wave is predominantly of double the rotation frequency and has essentially the form of a rectified sine wave. Because of the inequality of the alternate peaks however, there is also present a small component of rotation frequency as represented by the dotted curve IV.

A voltage of the rotation frequency is applied through filter 9 and phase shifter 10 to an amplifier 11 which delivers to the input of limiter 12 a sine wave having substantially the phase shown in curve V. At the same time a wave having the form of curve III is delivered directly from the output of 7 to the input of limiter 12 with a suitable inversion. The resultant wave applied to the input of limiter 12 will have the form of curve VI, this wave being made up of a sine wave of curve V plus an inverted wave having the form of curve III.

The limiter 12 may be any suitable type of limiting device preferably with an adjustable threshold, and the threshold of this limiter should be adjusted to the level indicated by the dotted line in curve VI so as to pass only alternate peaks. Thus there is applied to the vertical deflecting plates of tube 13 one single peak per revolution of loop 1, such peak having a time position dependent upon the direction of the arriving signal.

To the horizontal plates of the cathode ray tube 13 is applied a sawtooth sweep wave generated by sweep wave generator 14 and amplified by amplifier 8. It will be understood, of course, that amplifier 8 may be omitted if generator 14 delivers a sweep wave of sufficient voltage.

Figure 2:
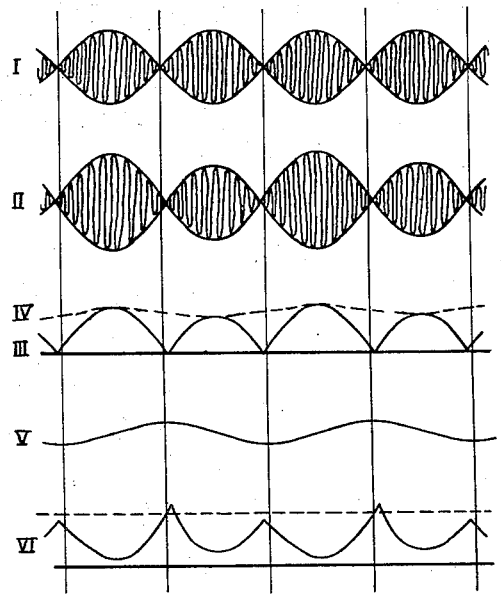
Fig. 2 is a set of curves useful in explaining the operation of my invention.
Figure 3:
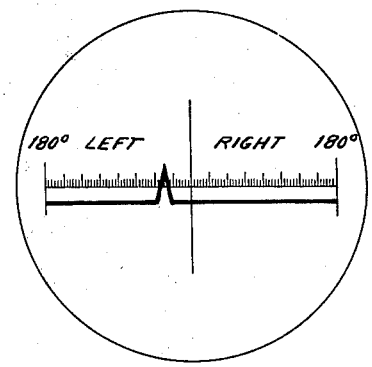
Fig. 3 represents the type of indication given by the preferred embodiment of my invention illustrated in Fig. 1.

The resultant pattern produced on the screen of cathode ray tube 13 will be somewhat as shown in Fig. 3. If it is desired to suppress the unnecessary horizontal portion of the indication so as to leave only the inverted V shaped mark, the voltage from the output of limiter 12 may be likewise applied to a modulating grid (not shown) of cathode ray tube so that the spot will be extinguished at all times excepting during the instant when a deflecting signal passes through the limiter 12. Instead of providing such extinction control for the spot a masking means may be provided to cover the lower half of the cathode ray tube screen so that only the inverted V shaped portion of the indication will show above the edge of the mask. In such case the limiter 12 will be no longer necessary since the mask itself will prevent the user from seeing anything but the alternate peaks of the indication even though this indication will then actually have the form of curve VI of Fig. 2.

It should be noted also that in cases where lightness and simplicity are of extreme importance the apparatus 9, 10, 11 and 12 may all be eliminated thus producing on the screen of the cathode ray tube a signal resembling curve III of Fig. 2 but inverted. Such indication will intersect the graduated scale of the screen at two points instead of one. If the input from antenna 3 is entirely suppressed the two peaks thus given will be 180° apart. For many purposes such indication will be satisfactory since an ambiguity of 180° is in many cases not serious. If the resolution of this ambiguity is required it may be achieved without the use of equipment 9, 10, 11 and 12 by adjusting antenna 3 so as to feed a substantial amount of energy although not quite as much as the energy supplied from loop 1. In such case the alternate loops of curve II will become very unequal in size and thus curve III will be modified so as to exhibit first two minima close together, then a long maximum, then again two minima close together, etc. The scale can then be graduated so that the direction will be correctly shown by (for example) the left-hand one of a pair of minima; then the navigator can readily learn to disregard the right-hand one of the two adjacent indications.

Whether the complete, accurate and easy-to-read arrangement of Fig. 1 or the abbreviated arrangement omitting elements 9, 10 and 11 be employed, it will be noted that in either case a very precise indication is given by virtue of the fact that cusp shaped minima are employed for the direction indication. Such use of the cusp shaped minima gives far more precise indications than can be obtained by the use of the rounded maxima while at the same time sense ambiguities are avoided in accordance with most of the preferred embodiments of the invention.

The detection and smoothing of the signals in receiver and detector 7 before using the cusp shaped minima thereof is advantageous in that the indication on the screen is in the form of an outline having a pointed or V shaped portion rather than in the form of a luminous area having a pointed or V shaped notch. This is especially important when it is desired to mask off (or otherwise block out) all except the essential V shaped point of the produced pattern.

It should be noted also that the arrangement of the present invention makes use of one single receiver for amplifying, heterodyning and detecting both the non-directional indications from antenna 3 and the rotation-modulated indications from loop 1.

What I claim is:

1. In a radio direction finder comprising a cathode ray indicator having a screen and means for forming a spot thereon, means for sweeping said spot along a substantially horizontal path, pick-up means including a constantly rotating member for deriving an undulating signal from incoming radio waves, means for deriving from said signal a signal whose envelope is characterized by sharp cusp shaped minima, said pick-up means including means for deriving further signals from said radio waves, means for combining said cusp-characterized signal and said further signals, means for deriving from the output of said combining means marking signals having inflection points corresponding to said sharp cusp shaped minima, means for separately deriving from the output of said combining means a wave of the frequency of said rotating member, and means for characterizing said spot during its sweep along said path under the control of said marking signals and said separately derived wave.

2. A radio direction finder comprising directional pick-up means for receiving signals from a radio wave whose direction is to be determined, means for effectively rotating the directional reception pattern of said pick-up means whereby the received signals are varied generally sinusoidally in amplitude, means for deriving from said generally sinusoidal signals a signal whose envelope is characterized by sharp cusp shaped minima, means for deriving further signals from said radio wave, means for combining said first-mentioned received signals with said further signals in such proportion as to yield resultant signals whose envelope is characterized by sharp cusp shaped minima but whose maxima are of unequal amplitude, means for amplifying said resultant signals, means for deriving therefrom sensing signals in accordance with the frequency of said effective rotation, means for deriving from said amplified resultant signals marking signals having sharp points of inflection corresponding to said cusp shaped minima, cathode ray indicating means having a screen and means for forming a spot thereon, means for controlling said spot to produce an indication on said screen under the control of said points of inflection of said marking signal, and means for rendering ineffective alternate ones of said inflection points under the control of said sensing signal.

3. A radio direction finder according to claim 2 wherein said means for controlling said spot by means of said marking signal comprises means for varying the brightness of said spot under the control of said marking signal.

4. A radio direction finder according to claim 2 wherein said means for controlling said spot by means of said marking signal comprises means for deflecting said spot perpendicularly to said path under the control of said marking signal.

5. A direction finder according to claim 2 wherein said means for rendering alternate ones of said inflection points ineffective comprises means for combining said sensing signals with said marking signals to render the inflection points unequal in amplitude and transmission limiting means for transmitting to said means for producing an indication only those portions of said marking signal which exceed a predetermined amplitude.

6. A direction finder according to claim 2 wherein said means for rendering alternate ones of said inflection points ineffective comprises means for combining said sensing signals with said marking signals to render the inflection points unequal in amplitude and means for masking all of said indications except those portions corresponding to the inflection points of greater amplitude.

HENRI G. BUSIGNIES.